US 6,650,348 B2

(12) United States Patent
Mariani et al.

(10) Patent No.: US 6,650,348 B2
(45) Date of Patent: Nov. 18, 2003

(54) SYSTEM AND METHOD FOR WEB-BASED CONTENT SCHEDULING

(75) Inventors: Rico Mariani, Kirkland, WA (US);
Stephen J. Butler, Chichester (GB);
Graham A. Ruffell, London (GB);
John Clement Gudenkauf, Bellevue, WA (US); Tara S. Prakriya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 09/765,239

(22) Filed: Jan. 17, 2001

(65) Prior Publication Data

US 2002/0093540 A1 Jul. 18, 2002

(51) Int. Cl.[7] ................................................. G09G 5/00
(52) U.S. Cl. ................................................... 345/853
(58) Field of Search ............................. 345/853–854, 345/760, 963; 715/513, 501.1; 707/102, 10; 709/218

(56) References Cited

U.S. PATENT DOCUMENTS

| 5,821,927 | A | * | 10/1998 | Gong ........................ 345/822 |
| 5,945,989 | A | * | 8/1999 | Freishtat et al. ............. 345/760 |
| 6,023,701 | A | * | 2/2000 | Malik et al. .................. 707/10 |
| 6,144,962 | A | * | 11/2000 | Weinberg et al. ............. 707/10 |
| 6,182,122 | B1 | * | 1/2001 | Berstis ........................ 709/217 |
| 6,243,089 | B1 | * | 6/2001 | Gong .......................... 345/744 |
| 6,278,448 | B1 | * | 8/2001 | Brown et al. ................. 345/866 |
| 6,308,188 | B1 | * | 10/2001 | Bernardo et al. ............ 715/530 |
| 6,360,227 | B1 | * | 3/2002 | Aggarwal et al. ............ 707/102 |
| 6,496,842 | B1 | * | 12/2002 | Lyness ........................ 715/514 |
| 6,567,812 | B1 | * | 5/2003 | Garrecht et al. ............. 707/100 |
| 6,578,078 | B1 | * | 6/2003 | Smith et al. ................. 709/224 |

* cited by examiner

*Primary Examiner*—Kristine Kincaid
*Assistant Examiner*—Sindya Narayanaswamy
(74) *Attorney, Agent, or Firm*—Woodcock Washburn LLP

(57) ABSTRACT

A system and method employ a hierarchical data structure wherein nodes in the structure have a parent/child as well as a temporal relationship. Accordingly, the parent-child relationship of various nodes may change as a function of time. This hierarchical structure is part of a system employed to schedule content on a web site or web page that changes over time.

29 Claims, 7 Drawing Sheets

SYSTEM AND METHOD FOR WEB-BASED CONTENT SCHEDULING

TECHNICAL FIELD

The present invention relates generally to systems and methods for scheduling the preparation and presentation of content. More particularly, the invention is directed to scheduling content for web sites and web pages.

BACKGROUND OF THE INVENTION

To remain relevant, many Web sites must constantly update information displayed on their Web pages. For example, as news stories break, news web sites must update web pages appropriately so that a user seeking news get the latest information. Various other types of information must be updated at more or less frequent intervals. Sports information changes daily. Stock information changes in minutes. Moreover, for merchandise-based web sites, the products sought by consumers will change based on seasons, holidays, and day of the week. On the other hand, some information may be of a recurring nature such as syndicated columns, weekly specials, and so on. The task of maintaining such information may be enormously complex as various sections and features of any given web page change at unrelated frequencies.

Adding to the complexity is the fact that some information and features on a web page may be related to other information on the web page. For example, it may be desirable to update weather information at certain times prior to events such as ball games, shows, and the like. In the case of on-line catalogs, certain sale items may be related to each other. As a result, more than one item on the web page must be updated simultaneously. Hence, there is a need for a system and method for providing a consistent framework for managing the scheduling of web site content.

SUMMARY OF THE INVENTION

The invention provides a framework for controlling and organizing the content and timing of changes to the content for Web sites, Web pages, etc. The invention uses a hierarchical data structure to maintain and organize content and to relate the content in time. Nodes in the hierarchy have a portion indicative of content to be displayed and a portion indicative of a time to display the content. Accordingly, for a given time T, a display process traverses the hierarchy to determine all nodes having content to be displayed. Any node having its time portion within a given time window of time T will be selected for display.

In one embodiment, the content is kept in a tree of nodes. The top level node is the root node that points to web site nodes. The web site nodes may have a series relationship to one another so that during a first time interval, the web site is defined by a tree of nodes subordinate to one of the web site nodes and at a second time interval the web site is defined by a tree of nodes subordinate to another one of the web site nodes. This series relationship carries though the entire tree structure and hence applies to web pages and web page slots (i.e. a portion of a web page). At every level of the tree, scheduling information is added so that it is know when that node in the tree (and the node's sub-tree) is live, and what node in the tree will replace it when it expires. Since this is done at every level of the tree, the system provides flexibility of having as many or as few levels of scheduling as is desired.

Each node additionally contains content or a pointer to content. Hence, after a tree is populated with appropriate node content associations, the information in the tree can be viewed as it would appear at any moment in time by filtering out any nodes that are not yet "live" or that have expired within a given time window of a selected time. Additionally, the invention can be used to create comprehensive views of the content as it appeared for a day, a week, a month, or any chosen time period.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Figure 1:
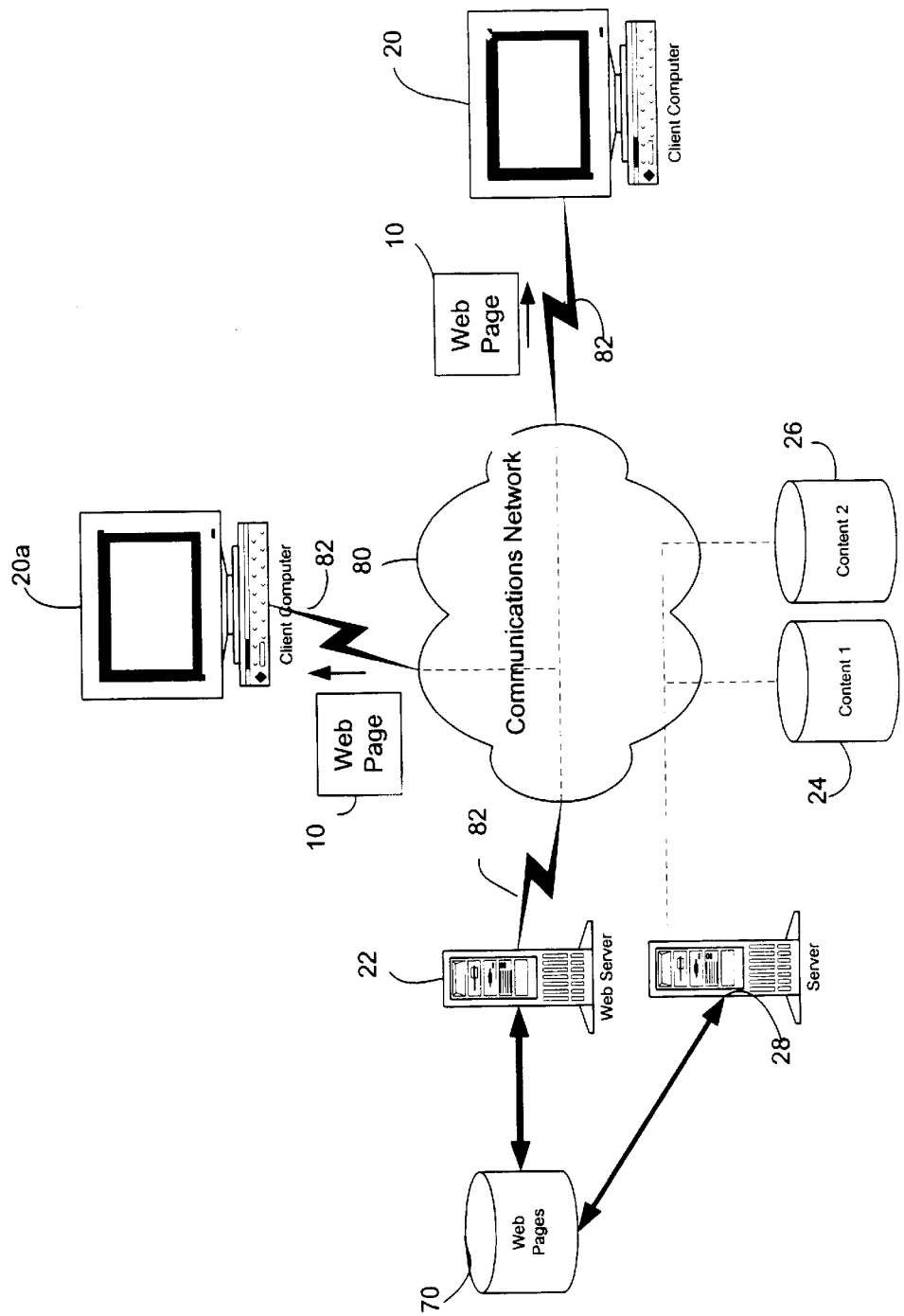
FIG. 1 is a schematic diagram representing a network computer model in which aspects of the present invention may be incorporated.

The present invention addresses the need for a system and method for scheduling content on a web site. To that end, the system and method provide a hierarchical tree like structure comprising nodes that have a temporal as well as a parent-child relationship. At various times, the respective parent or child node may change. This hierarchy can be advantageously used to schedule content in a hierarchical manner for use in web sites and/or web pages wherein various aspects of the content on the web site or page changes through time.

Exemplary Operating Environment

The present invention is preferably deployed in a network environment, particularly where that network is an Internet or Intranet environment. The term "Internet" is an abbreviation for "Internetwork," and refers commonly to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the non-textual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well, as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Uniform Resource Locator (URL). The network address can be referred to as a Universal Resource Locator address. For example, communication can be provided over a communications medium. In particular, the client and server may be coupled to one another via TCP/IP connections for high-capacity communication. Active within the client is a first process, known as a "browser," which establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data. Each web page can also be referred to simply as a "page."

The client typically displays the information provided through the network by the server, using a software application known as a browser. Most browsers have modem graphical user interfaces that are capable of displaying and manipulating various types of data. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., typically with a URL). The URL address has two basic components, the protocol to be used and the object pathname. For example, the URL address, "http://www.uspto.gov" (i.e., home page for the U.S. Patent and Trademark Office), specifies a HTTP and a pathname of the server ("www.uspto.gov"). The server name is associated with one or more equivalent TCP/IP address.

FIG. 1 illustrates an exemplary network environment in which the present invention may be employed. Of course, actual environments can be arranged in a variety of configurations; however, the environment is shown here in the context of a client-server system to provide a framework for understanding the type of environment in which the present invention operates. The system may include client computers 20, 20a, which could be personal computers, thin clients, hand-held computing devices, and so on. Additionally, the system may include a server computer 22, and storage 70, which is coupled to and controlled by server computer 22. The client and server computers communicate with each other by way of communications network 80, which may be a LAN, a WAN, intranet, the Internet, etc.

Client computers 20, 20a and server computer 22 are connected to communications network 80 by way of communications interfaces 82. Communications interfaces 82 can be any one of the well-known communications interfaces such as Ethernet connections, modem connections, DSL connections and so on. Communications interfaces 82 may also be by way of an intermediate communications network such as a LAN.

Users of client computers 20, 20a may generate references to web pages 10 that are stored in web page storage 70 managed by web server 22. Web server 22 receives the URL or other reference to a web page stored in storage 70 and retrieves the page for delivery. Those web pages are then delivered over communications network 80 for display on the requesting client computer 20, 20a.

According to an aspect of the present invention, web pages stored in web page storage 70 may be derived from a variety of content providers. As illustrated in FIG. 1, at least a portion of the content stored in web pages 70 is derived from content providers content 1 24 and content 2 26. A server 28 acts as the arbiter of information between web page storage 70 and content providers 1 and 2 (24, 26). This information may also be provided by way of communications network 80 or by some other means, e.g., dial-up connection, manual compilation, and the like.

Figure 2:
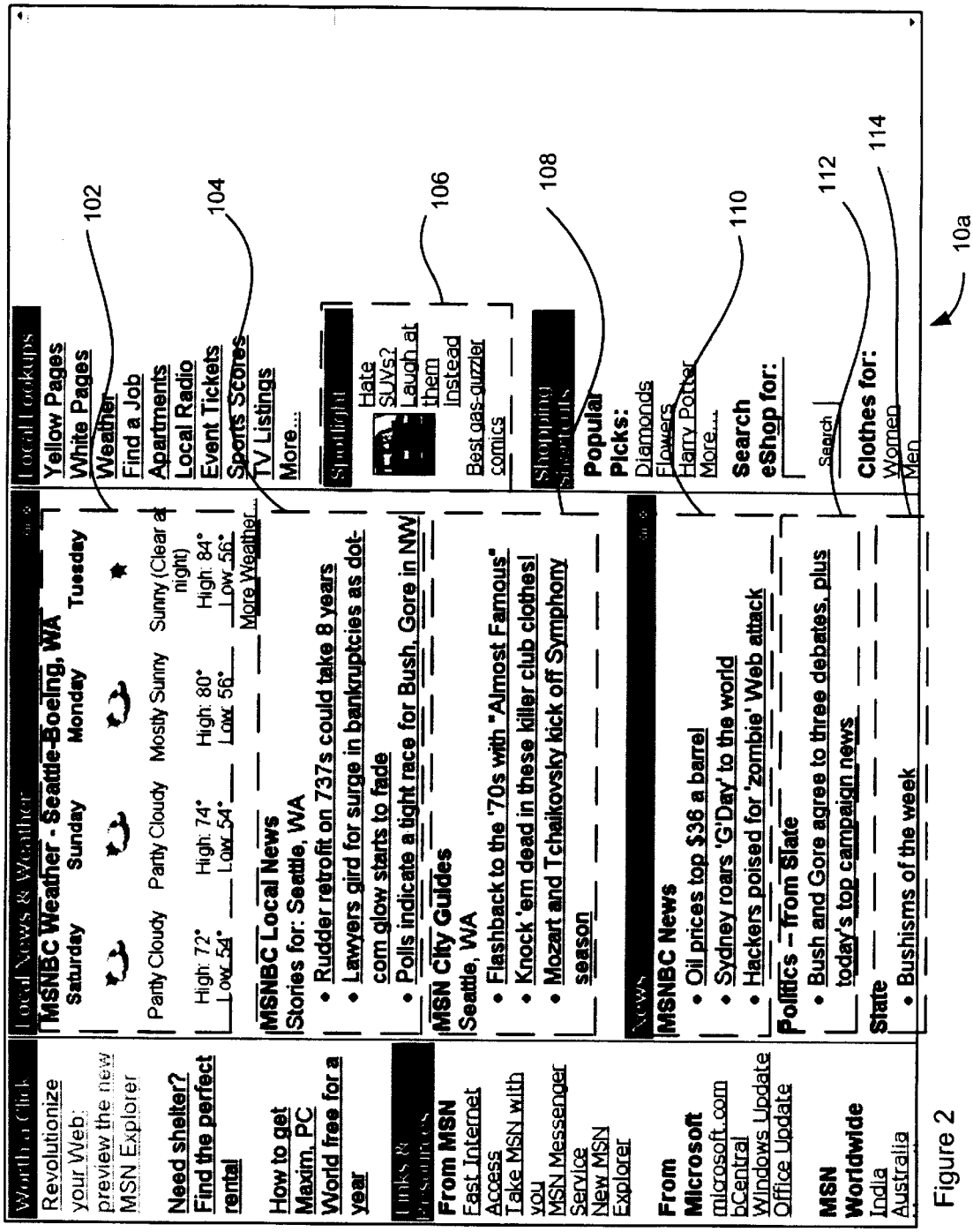
FIG. 2, is an example web page that illustrates the compilation of information from a variety of sources.

FIG. 2 shows an exemplary web page 10*a* similar to a web page 10 that may be requested by clients 20, 20*a*. As described above, web pages like web page 10*a* may contain information compiled from a variety of content sources (e.g., content 124, content 226). For example, page 10*a* contains weather information 102 that maybe derived from a weather information content source such as Accuweather, Weather channel, and so on. Local news information 104 may be provided by a local new source. A city guide 108 may provide information about current activities within a local area, which may be provided from one or more local sources. National news 108 may be provided from a national news source such as Reuters or Associated Press. Political news 112, 114 may be provided from yet another content provider. Web page 10*a* also provides comic content 106 as well as a variety of links to various other sources.

Notably, the information displayed on web page 10*a* may change ansynchronously with respect to other information on the page. For example, weather information will likely be updated at least once a day. News headlines will likely change at more frequent intervals to keep pace with the breaking news issues. Whereas various links and other information on the page may change more or less frequently.

Figure 3:
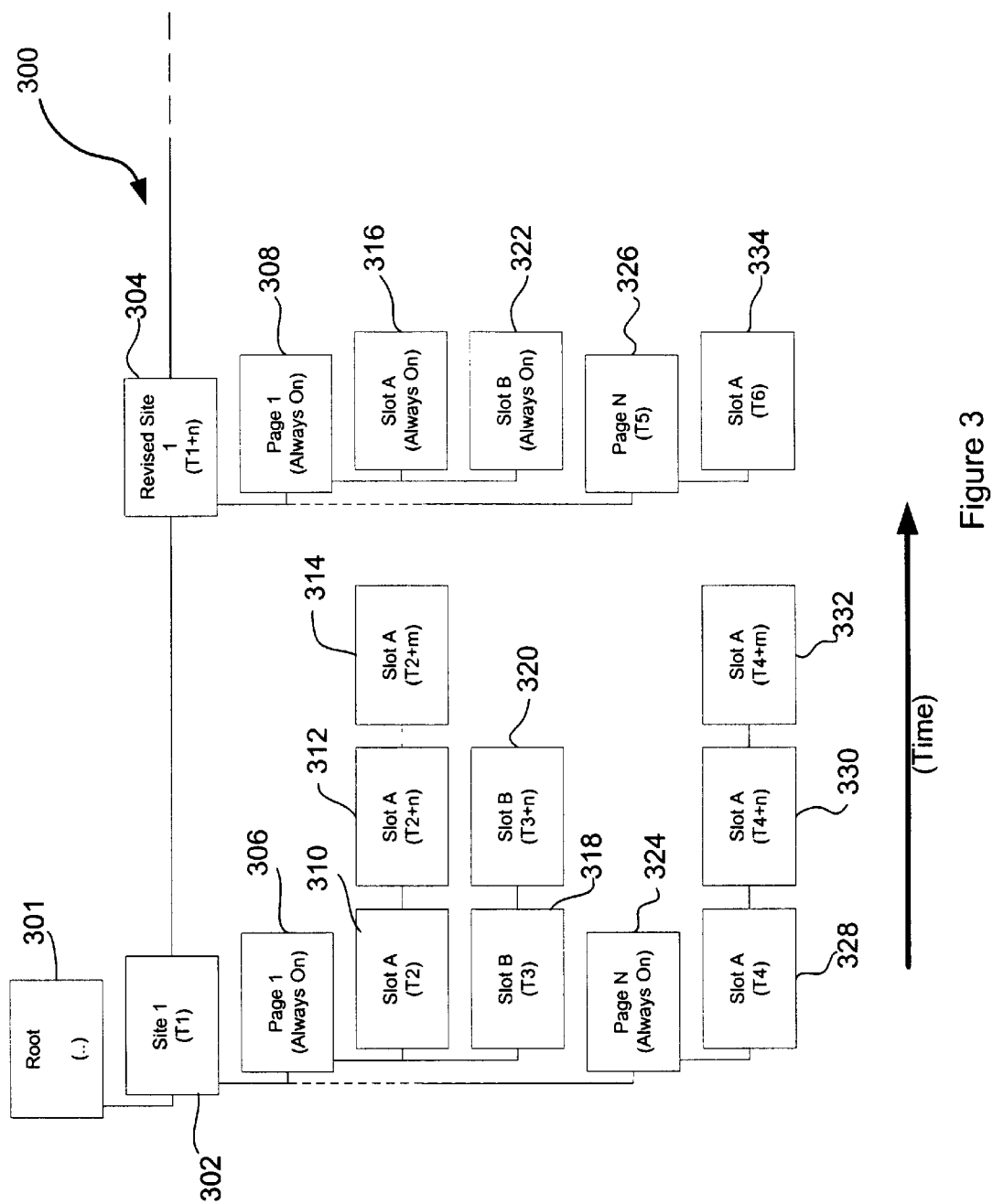
FIG. 3 is an exemplary tree hierarchy for use in connection with scheduling web content.

According to an aspect of the present invention, a hierarchical data structure is provided that simplifies the scheduling of content on web pages and the like. FIG. 3 illustrates features of the data structure that provide the scheduling mechanism. In essence the structure 300 is a tree of nodes wherein nodes may have a hierarchical relationship as well as a temporal relationship. For example, node 302 and node 304 have a temporal relationship whereas nodes 302 and 306 and 324 have a hierarchical relationship. That is, the branch of the structure 300 that is subordinate to node 304 replaces the branch of tree 300 that is subordinate to node 302 as time moves from T1 to T1+n. This temporal relationship may exist at each succeeding layer of the tree. Thus, node 314 replaces node 312 which replaces node 310 as time moves to T2+m from T2+n from T2. This structure provides a very simplified way to organize and schedule content that changes over time relative to other content.

The hierarchical aspects of the tree provide an organizational discipline on the content relative to other content. A root 301 has a number of subordinate web site nodes. A web site node has one or more subordinate page nodes. A page node has a number of subordinate slot nodes and so on depending on the desired content granularity (shown here to the level of slot node for clarity).

Each node has an associated time value that is indicative of the time proximate when its content should be scheduled. Thus at time T2 the content of slot A could be validly scheduled with respect to page 1. Although the times are indicated in FIG. 3 as a time at which they become valid, e.g., time T2, the time parameter may be specified in a number of different ways. For example, the associated time may be specified as a starting time with no ending time, having no starting time and only an ending time, having a starting time and a stopping time, or having no start time and no end time. When a node has a starting time with no ending time, the node content remains valid after its starting time as long as the parent node remains on line. When a node has no starting time and only an ending time, the node's content is on-line when the parent is on-line but goes off line at the specified ending time or when the parent goes off-line, whichever is earliest. When a node has a starting time and an ending time, then the node's content goes on-line when the parent is on-line an its starting time has been reached and goes off-line when its parent goes off-line or its ending time has been reached. When a node has no starting or ending time, then the node's content goes on-line whenever its parent is on-line. The aforementioned examples, are just variations that illustrate some of the timing flexibility that may be associated with nodes and is by no means meant to be exhaustive.

In addition to having an associated time value, each node has associated content information. This content information can be stored as part of the data structure comprising a node, but more likely would be implemented as a file or object pointed to by a value associated with a node. Moreover, some nodes may not have any content per se but may rather contain only the content compiled by its subordinate nodes. The file or object may contain graphic information, textual information, or both. Graphical information may be in the form of JPEG, GIF, Video, and so on. Textual information may plain text or structural information such as rows in a database, HTML, XML, and so on.

Figure 4:
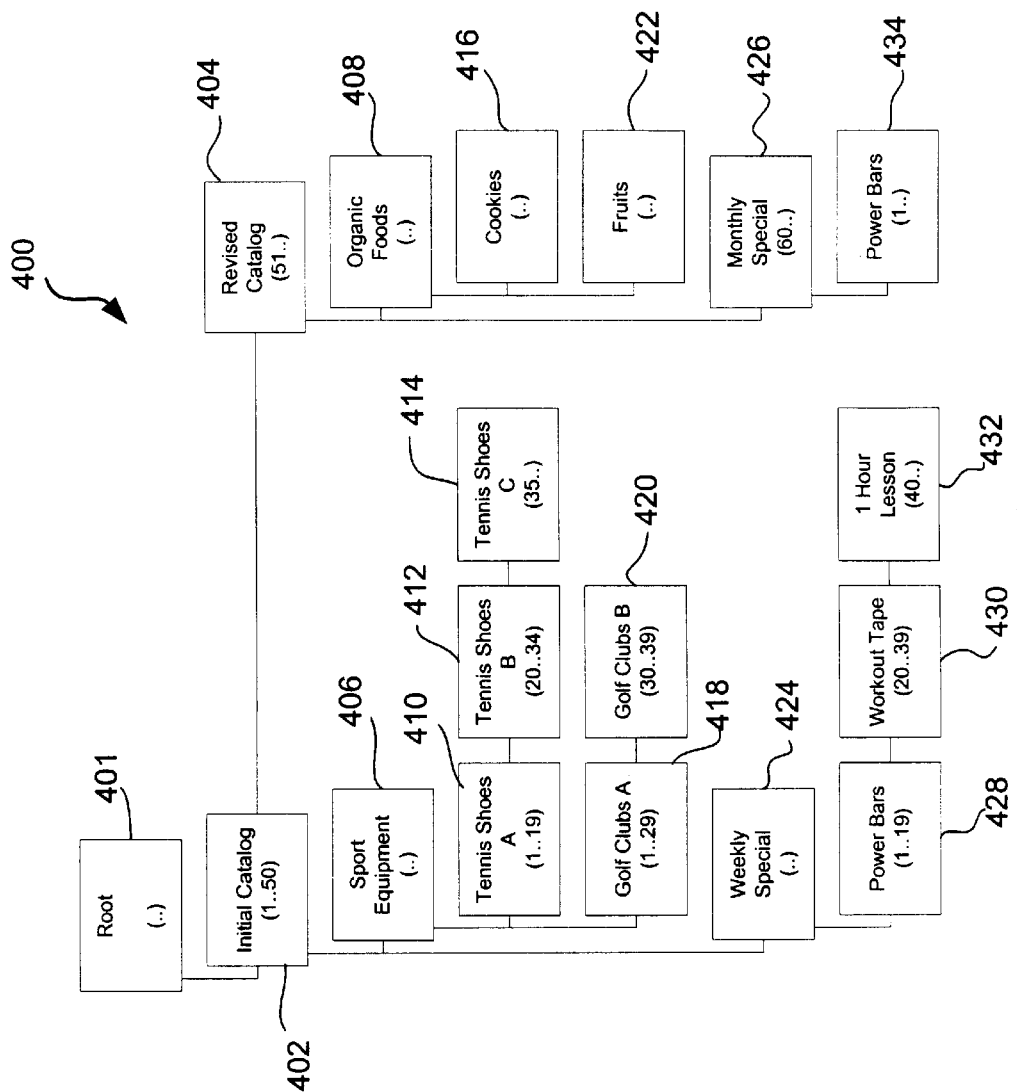
FIG. 4 is an example tree hierarchy in accordance with an aspect of the invention that has been populated with catalog information.

FIG. 4 provides an example of a hierarchical data structure that has been populated with time and content information to further illustrate the operation of the present invention. The following nomenclature is used to express the time value associated with the nodes in the figure:

(..) means no online time or offline time (i.e. always online).

(n..) means online starting at time n but no offline time (i.e. doesn't go offline after time "n").

(..m) means offline at time n but no online time (i.e. always online until time "m").

(n..m) means goes online at time n and offline at time m. Of course, as is described above, these times are subordinate to the parent online times (e.g. a node marked (..) would still go offline when its parent went offline). Moreover, times are sequential so that if two nodes participate in the same sequence (e.g. nodes 410, 412, 414 are sequential), when the next node comes online, then the previous node goes off line even if it still has a valid online time.

Node 402 represents catalog information such as may be used to provide an on-line merchant site. Node 402 provides an initial catalog of items and is valid for time 1 through 50 (the time interval may be seconds, minutes, days, months, years, etc. depending on the particular application). At time 51, node 404 becomes valid and node 402 becomes invalid. Hence, the revised catalog content replaces the initial catalog content. The new catalog no longer has a sports equipment page (406). Instead, the new catalog has organic foods (node 408) with slots for cookies (node 416) and fruits (node 422). Interestingly, monthly specials page (node 426) goes on-line after the revised catalog (node 404), as indicated by the time 60 associated with node 426 as compared to the time 51 associated with node 404. Power bars node 434 does not go on-line until after time 60 because it is dependent from the monthly specials node 426, even though its time value is less than that of its parent node 426.

Figure 5:
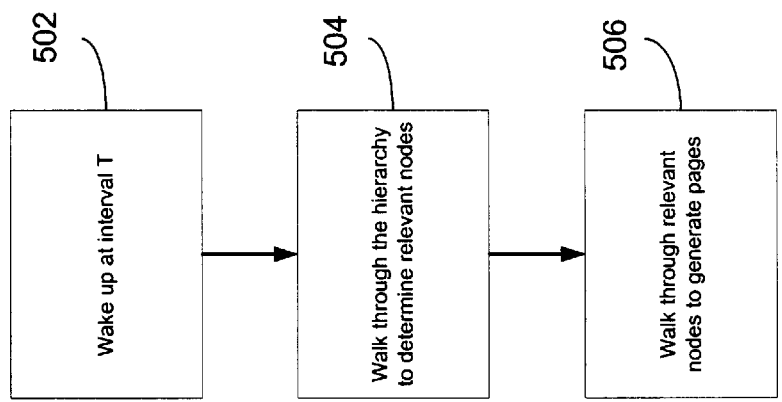
FIG. 5 is a flow chart illustrating the operation on the hierarchy to determine and prepare the appropriate content to be scheduled.

FIG. 5 is a flow chart that illustrates one embodiment of a program flow for a content scheduler that operated on the hierarchical data structure of the present invention. In accordance with that embodiment. The content scheduler wakes up at time interval T to begin the process (502). Then, the content scheduler walks through the hierarchy to determine all of the relevant nodes (i.e. which nodes are now valid and which are invalid). An exemplary algorithm embodiment for walking through the hierarchical tree is expressed in pseudo code as follows for a particular time 't':

```
begin at the (unique) root node as the current node
  examine the current node
    if the current node is not part of a series
      examine its online time and offline time
      if 't' is >= the online time and 't'< the offline time then
        accept it, and visit all of its child nodes apply the algorithm in turn to each child node/series
      otherwise
        reject the node and do not consider its children
    if the current node is part of a series then
      select the usable node with the greatest online time that is not yet offline, (online time<='t' and offline time>'t')
      if there is no such node
        reject all nodes from this series, and do not examine their children
      if there is such a node (and it is necessarily unique)
        accept the selected node, and visit all of its child nodes, and apply the algorithm in turn to each child node/series
        nodes with no online time have an effective online time of 0
        nodes with no offline time have an effective offline time of positive infinity (i.e. they never go offline, but they can be replaced by a node with a higher online time)
```

The algorithm is stated here in a simple to understand way. Depending on the choice of implementation language there are many different ways it could be effected. For example, it is desirable to compute many results simultaneously (i.e. entire levels of the tree at once) while still following these rules described by the pseudo code.

Figure 6:
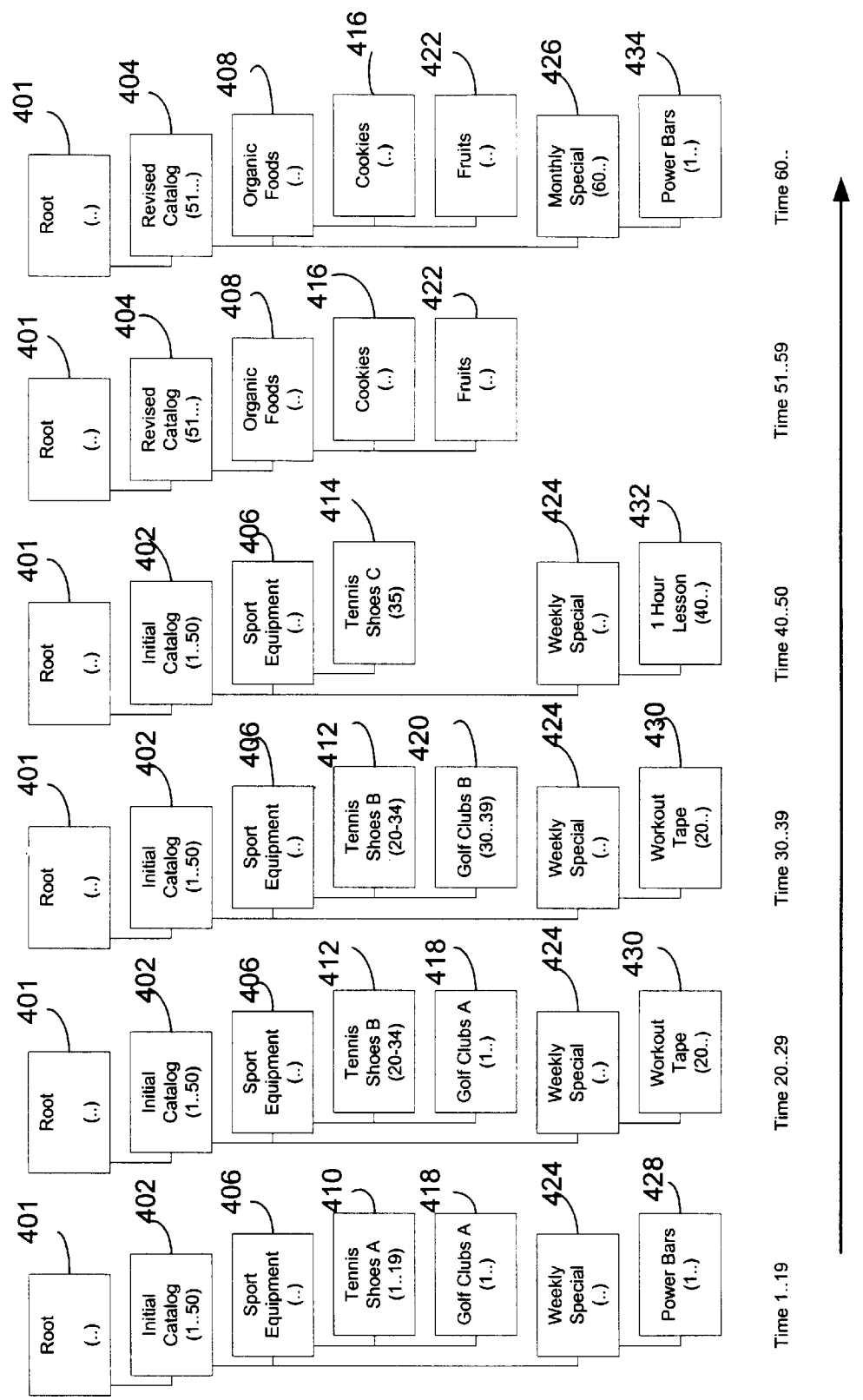
FIG. 6 is an illustration of views of the example hierarchy of FIG. 4 as viewed at different time intervals.

FIG. 6 is an illustration of how various nodes of FIG. 4 would be selected by the algorithm of FIG. 5 and described above. For example, at time interval 1 through 19, initial catalog node 402 is available and on line. Initial catalog node 402 remains on line until time interval 51 through 59 at which time revised catalog node 404 and its children nodes come on line. Within each branch (i.e. the branch of node 402 and the branch of 404) various other nodes come on line and go off line depending on the time interval and the nodes time value as well as the validity of respective parent nodes.

Figure 7:
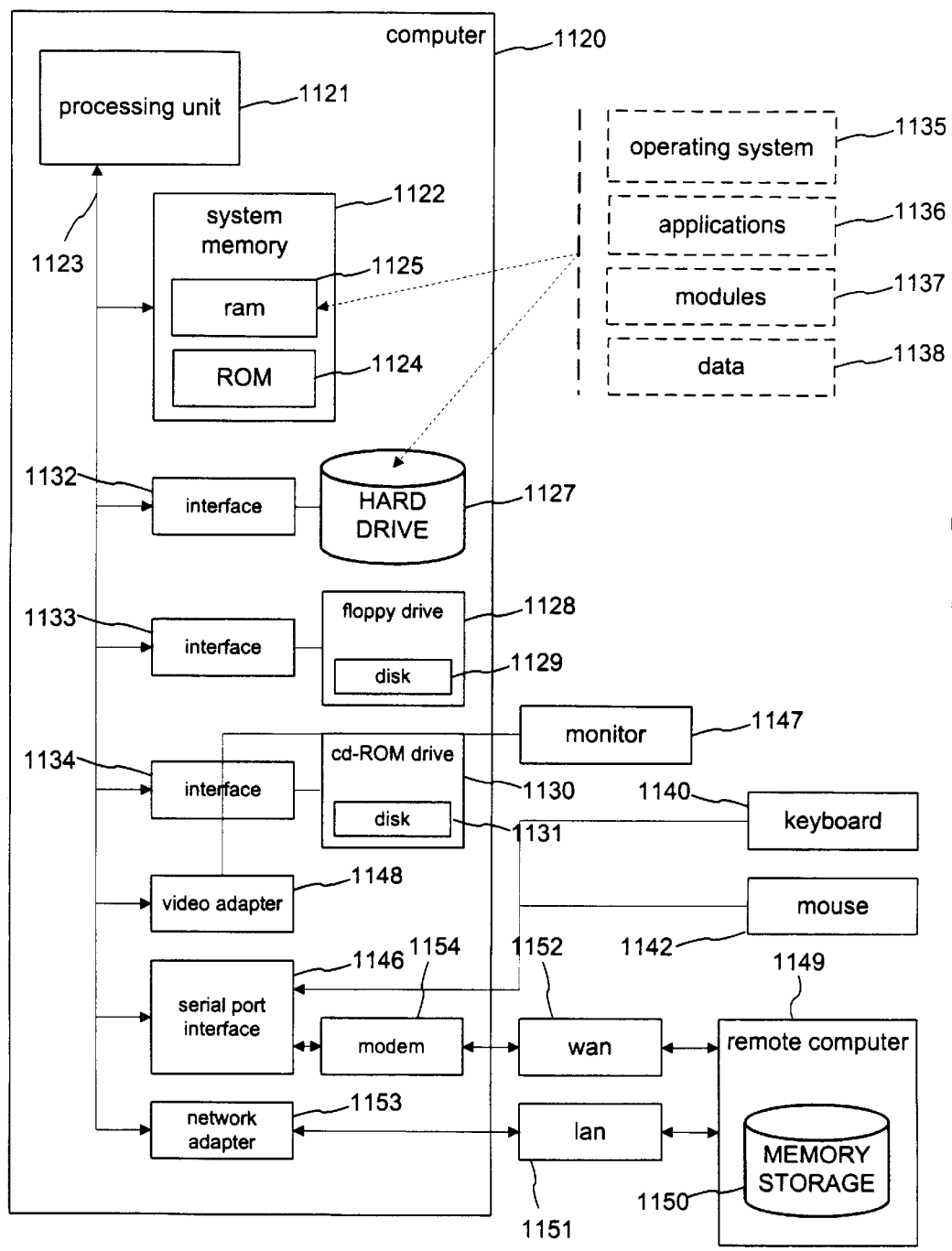
FIG. 7 is an illustrative computer system on which the software and methods of the present invention may be executed.

FIG. 7 illustrates an exemplary computing environment in which the program code that embodies the methods or system of the present invention may be executed. Those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program code and program modules comprising program code may be located in both local and remote memory storage devices.

With reference to FIG. 7, an exemplary system for implementing the invention includes a general purpose computing device in the form of a conventional computer 1120, including a processing unit 1121, a system memory 1122, and a system bus 1123 that couples various system components including the system memory to the processing unit 1121. The system bus 1123 may be any of several types of bus structures including a memory bus or memory controller, a peripheral bus, and a local bus using any of a variety of bus architectures. The system memory includes read only memory (ROM) 1124 and random access memory (RAM) 1125. A basic input/output system 1126 (BIOS), containing the basic routines that helps to transfer information between elements within the computer 1120, such as during start-up, is stored in ROM 1124. The computer 1120 further includes a hard disk drive 1127 for reading from and writing to a hard disk, not shown, a magnetic disk drive 1128 for reading from or writing to a removable magnetic disk 1129, and an optical disk drive 1130 for reading from or writing to a removable optical disk 1131 such as a CD ROM or other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide nonvolatile storage of computer readable instructions, data structures, program modules and other data for the computer 1120. Although the exemplary environment described herein employs a hard disk, a removable magnetic disk 1129 and a removable optical disk 1131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 1129, optical disk 1131, ROM 1124 or RAM 1125, including an operating system 1135, one or more application programs 1136, other program modules 1137, and program data 1138. A user may enter commands and information into the computer 1120 through input devices such as a keyboard 1140 and pointing device 1142. Other input devices (not shown) may include a microphone, joystick, game pad, satellite dish, scanner, or the like. These and other input devices are often connected to the processing unit 1121 through a serial port interface 1146 that is coupled to the system bus, but may be connected by other interfaces, such as a parallel port, game port or a universal serial bus (USB). A monitor 1147 or other type of display device is also connected to the system bus 1123 via an interface, such as a video adapter 1148. In addition to the monitor, computers typically include other peripheral output devices (not shown), such as speakers and printers.

The computer 1120 may operate in a networked environment using logical connections to one or more remote computers, such as a remote computer 1149. The remote computer 1149 may be another computer, a server, a router, a network PC, a peer device or other common network node, and typically includes many or all of the elements described above relative to the computer 1120, although only a memory storage device 1150 has been illustrated in FIG. 6. The logical connections depicted in FIG. 6 include a local area network (LAN) 1151 and a wide area network (WAN) 1152. Such networking environments are commonplace in offices, enterprise-wide computer networks, intranets and the Internet.

When used in a LAN networking environment, the computer 1120 is connected to the local network 1151 through a network interface or adapter 1153. When used in a WAN networking environment, the computer 1120 typically includes a modem 1154 or other means for establishing communications over the wide area network 1152, such as the Internet. The modem 1154, which may be internal or external, is connected to the system bus 1123 via the serial port interface 1146. In a networked environment, program modules depicted relative to the computer 1120, or portions thereof, may be stored in the remote memory storage device. It will be appreciated that the network connections shown are exemplary and other means of establishing a communications link between the computers may be used.

While the invention is susceptible to various modifications and alternative constructions, certain illustrated embodiments have been shown in the drawings and accompanying detailed description. It should be understood, however, that there is no intention to limit the invention to the specific constructions disclosed herein. For example, while the primary example used throughout was described in connection with content scheduling for an Internet web site, the present invention is by no means limited to such a system, but could be useful in any system wherein textual, graphic, or other information is scheduled for compilation at various times. As such, the invention is intended to cover all modifications, alternative constructions, and equivalents falling within the scope and spirit of the invention.

What is claimed is:

1. A method for Web site content scheduling, comprising:
   providing a hierarchical data structure, wherein nodes in the hierarchical data structure have an associated time value and an associated content value, wherein nodes lower in the hierarchical data structure have a time value dependent on their parent nodes;
   at a predefined time interval, traversing the hierarchical data structure and selecting nodes within a given range of current time; and
   scheduling content associated with selected nodes for compilation into web pages.

2. The method as recited in claim 1 wherein a node subordinate in the hierarchical data structure contains content subordinate to its parent such that the content in the subordinate node is not selected when its parent is not selected.

3. The method as recited in claim 1 wherein at least one node in the hierarchical data structure has a pointer to content.

4. The method as recited in claim 3 wherein the content comprises text.

5. The method as recited in claim 3 wherein the content comprises graphical information.

6. The method as recited in claim 4 wherein the text comprises structured data.

7. The method as recited in claim 6 wherein the structured data comprises one of HTML, XML, and database rows.

8. The method as recited in claim 1 wherein at least two nodes have a series relationship wherein the at least two nodes have a common parent and said at least two nodes have a temporal relationship to each other.

9. The method as recited in claim 1 further comprising compiling said content associated with selected nodes into a web page and associating the web page with a web site.

10. The method as recited in claim 9 further comprising replacing a web page in the store with a web page having a temporal relationship wherein the replacement web page has an associated time that is later the previously stored web page.

11. A computer-readable medium bearing computer readable instruction for carrying out Web site content scheduling, comprising:
    instructions for providing a hierarchical data structure, wherein nodes in the hierarchical data structure have an associated time value and an associated content value, wherein nodes lower in the hierarchical data structure have a time value dependent on their parent nodes;
    instructions for, at a predefined time interval, traversing the hierarchical data structure and selecting nodes within a given range of current time; and
    instructions for scheduling content associated with selected nodes for compilation into web pages.

12. The computer-readable medium as recited in claim 11 further comprising instructions for compiling said content associated with selected nodes into a web pages and associating the web pages with a web site.

13. The computer readable medium as recited in claim 12 further comprising instructions for replacing web pages in the store with web pages having a temporal relationship wherein the replacement web page has an associated time that is later the previously stored web page.

14. The computer-readable medium as recited in claim 11 wherein a node subordinate in the hierarchical data structure contains content subordinate to its parent such that the content in the subordinate node is not selected when its parent is not selected.

15. The computer readable medium as recited in claim 11 wherein at least one node in the hierarchical data structure has a pointer to content.

16. The computer-readable medium as recited in claim 15 wherein the text comprises structured data.

17. The computer-readable medium as recited in claim 16 wherein the structured data comprises one of HTML, XML, and database rows.

18. The computer-readable medium as recited in claim 11 wherein the content comprises text.

19. The computer-readable medium as recited in claim 11 wherein the content comprises graphical information.

20. The computer-readable medium as recited in claim 11 wherein at least two nodes have a series relationship wherein the at least two nodes have a common parent and said at least two nodes have a temporal relationship to each other.

21. The computer-readable medium as recited in claim 11 wherein the computer-readable medium comprises a carrier wave.

22. A data structure for scheduling web content at a predefined time interval, wherein nodes in the structure are traversed and selected within a given range of time and the content is associated with the selected nodes for compilation into web pages, comprising:
    a first node having an associated first time value and an associated first content value, the first content value indicative of first information to display on a web page and the first time value indicative of a valid time for displaying the first information; and
    a second node subordinate to the first node, the second node having an associated second time value and an associated second content value, the second content value indicative of second information to display on the web page and the second time value indicative of a valid time for displaying the second information, wherein the second time value is dependent on the first time value.

23. The data structure as recited in claim 22 further comprising a third node subordinate to the first node and having an associated time value greater than the time value associated with the second node such that at a time less than the time value associated with the third node, the content associated with the second node is subordinate to the first node and at a time greater than or equal to the time value associated with the third node, the content associated with the third node is subordinate to the first node.

24. The data structure as recited in claim 22 wherein the first node comprises a structure indicative of a web site.

25. The data structure as recited in claim 22 wherein the second node comprises a structure associated with a web page.

26. The data structure as recited in claim 22 wherein the second information comprises text.

27. The data structure as recited in claim 22 wherein the second information comprises graphical information.

28. The data structure as recited in claim 26 wherein the text comprises structured data.

29. The data structure as recited in claim 28 wherein the structured data comprises one of HTML, XML, and database rows.

* * * * *